United States Patent
Uenishi et al.

(10) Patent No.: US 11,107,631 B2
(45) Date of Patent: Aug. 31, 2021

(54) CERAMIC ELECTRONIC DEVICE AND MANUFACTURING METHOD OF CERAMIC ELECTRONIC DEVICE

(71) Applicant: TAIYO YUDEN CO., LTD., Tokyo (JP)

(72) Inventors: Hiroaki Uenishi, Takasaki (JP); Takehiko Kamobe, Takasaki (JP); Tomoaki Nakamura, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 9 days.

(21) Appl. No.: 16/138,148

(22) Filed: Sep. 21, 2018

(65) Prior Publication Data

US 2019/0096577 A1    Mar. 28, 2019

(30) Foreign Application Priority Data

Sep. 27, 2017    (JP) .............................. JP2017-186228

(51) Int. Cl.
*H01G 4/12*    (2006.01)
*H01G 4/005*    (2006.01)
(Continued)

(52) U.S. Cl.
CPC .............. *H01G 4/12* (2013.01); *H01G 4/005* (2013.01); *H01G 4/232* (2013.01); *H01G 4/2325* (2013.01); *H01G 4/30* (2013.01)

(58) Field of Classification Search
CPC .......... H01G 4/30; H01G 4/232; H01G 4/252; H01G 4/12; H01G 4/005; H01G 4/2325
(Continued)

(56) References Cited

U.S. PATENT DOCUMENTS

| 2009/0310277 A1* | 12/2009 | Kayatani | ................ H01G 4/005 361/306.3 |
| 2010/0202098 A1* | 8/2010 | Yanagida | ................ H01G 4/30 361/305 |

(Continued)

FOREIGN PATENT DOCUMENTS

| CN | 101783243 A | 7/2010 |
| CN | 104078234 A | 10/2014 |

(Continued)

OTHER PUBLICATIONS

A First Office Action issued by the State Intellectual Property Office of China dated Apr. 16, 2021, for Chinese counterpart application No. 201811106930.X. (7 pages).

(Continued)

*Primary Examiner* — Arun Ramaswamy
(74) *Attorney, Agent, or Firm* — Law Office of Katsuhiro Arai (57) ABSTRACT

A ceramic electronic device includes: a ceramic main body having at least two edge faces facing each other; and external electrodes formed on the two edge faces, wherein: the external electrodes have a structure in which a plated layer is formed on a ground layer having ceramic; a main component of the ground layer is a metal; the external electrodes have an extension region that extends to at least one of four side faces from the two edge faces of the ceramic main body; a part of the extension region corresponding to a corner portion of the ceramic main body has a first portion having a maximum spaced distance of 10 μm or less in a face direction of the ground layer; and the plated layer has an average thickness that is 30% or more with respect to the maximum spaced distance, and covers the first portion.

8 Claims, 6 Drawing Sheets

(51) Int. Cl.
*H01G 4/30* (2006.01)
*H01G 4/232* (2006.01)

(58) Field of Classification Search
USPC ............. 361/306.3, 321.1–321.3, 301.4, 303
See application file for complete search history.

(56) References Cited

U.S. PATENT DOCUMENTS

| | | |
|---|---|---|
| 2013/0182368 A1 | 7/2013 | Jeon et al. |
| 2014/0292141 A1 | 10/2014 | Nishisaka et al. |
| 2015/0116898 A1* | 4/2015 | Takashima ............... H01G 4/30 361/301.4 |
| 2015/0243439 A1 | 8/2015 | Kwag |
| 2016/0247632 A1 | 8/2016 | Tsukida et al. |

FOREIGN PATENT DOCUMENTS

| | | | |
|---|---|---|---|
| CN | 104576055 | A | 4/2015 |
| CN | 104867673 | A | 8/2015 |
| JP | 2008112759 | A | 5/2008 |
| JP | 2013149939 | A | 8/2013 |
| JP | 2014220127 | A | 11/2014 |
| JP | 2016152379 | A | 8/2016 |

OTHER PUBLICATIONS

A Notice of Reasons for Refusal issued by the Japanese Patent Office, dated Jul. 13, 2021, for Japanese counterpart application No. 2017-186228. (4 pages).

* cited by examiner

CERAMIC ELECTRONIC DEVICE AND MANUFACTURING METHOD OF CERAMIC ELECTRONIC DEVICE

CROSS-REFERENCE TO RELATED APPLICATION

This application is based upon and claims the benefit of priority of the prior Japanese Patent Application No. 2017-186228, filed on Sep. 27, 2017, the entire contents of which are incorporated herein by reference.

FIELD

A certain aspect of the present invention relates to a ceramic electronic device and a manufacturing method of a ceramic electronic device.

BACKGROUND

In order to improve humidity resistance of ceramic electronic devices such as a multilayer ceramic capacitor, it is demanded that a corner portion of a ceramic main body (round edge) is sufficiently covered with a baked ground layer of an external electrode. And so, there is disclosed a technology in which a deviation of a thickness of the external electrode is reduced, and a thickness of a part of the external electrode on the round edge is secured (for example, see Japanese Patent Application Publication No. 2013-149939).

SUMMARY OF THE INVENTION

However, it is not easy to secure the thickness of the ground layer of the round edge by coating a conductive metal paste. And it is not easy to maintain the thickness of the ground layer of the round edge during a sintering and a plating. Therefore, high humidity resistance may not be necessarily be achieved because a discontinuous portion occurs in the ground layer.

The present invention has a purpose of providing a ceramic electronic component and a manufacturing a ceramic electronic component that are capable of achieving high humidity resistance.

According to an aspect of the present invention, there is provided a ceramic electronic device including: a ceramic main body that has at least two edge faces facing each other, has an internal electrode layer inside thereof and has a parallelepiped shape; and external electrodes formed on the two edge faces, wherein: the external electrodes have a structure in which a plated layer is formed on a ground layer having ceramic; a main component of the ground layer is a metal; the external electrodes have an extension region that extends to at least one of four side faces from the two edge faces of the ceramic main body; a part of the extension region corresponding to a corner portion of the ceramic main body has a first portion having a maximum spaced distance of 10 μm or less in a face direction of the ground layer; and the plated layer has an average thickness that is 30% or more with respect to the maximum spaced distance, and covers the first portion.

According to another aspect of the present invention, there is provided a manufacturing method of a ceramic electronic device comprising: preparing a ceramic main body that has at least two edge faces facing each other, has an internal electrode layer inside thereof, has a parallelepiped shape and has a ground layer, a main component of the ground layer being a metal, the ground layer having an extension region extending from the two edge faces toward at least one of four side faces of the ceramic main body, the ground layer having a first portion in a part of the extension region corresponding to a corner portion of the ceramic main body, a maximum spaced distance of the first portion being 10 μm or less in a face direction of the ground layer; and forming a plated layer on the ground layer by a plating process that has an average thickness of 30% or more with respect to the maximum spaced distance and covers the first portion.

DETAILED DESCRIPTION

A description will be given of an embodiment with reference to the accompanying drawings.

Embodiment

Figure 1:
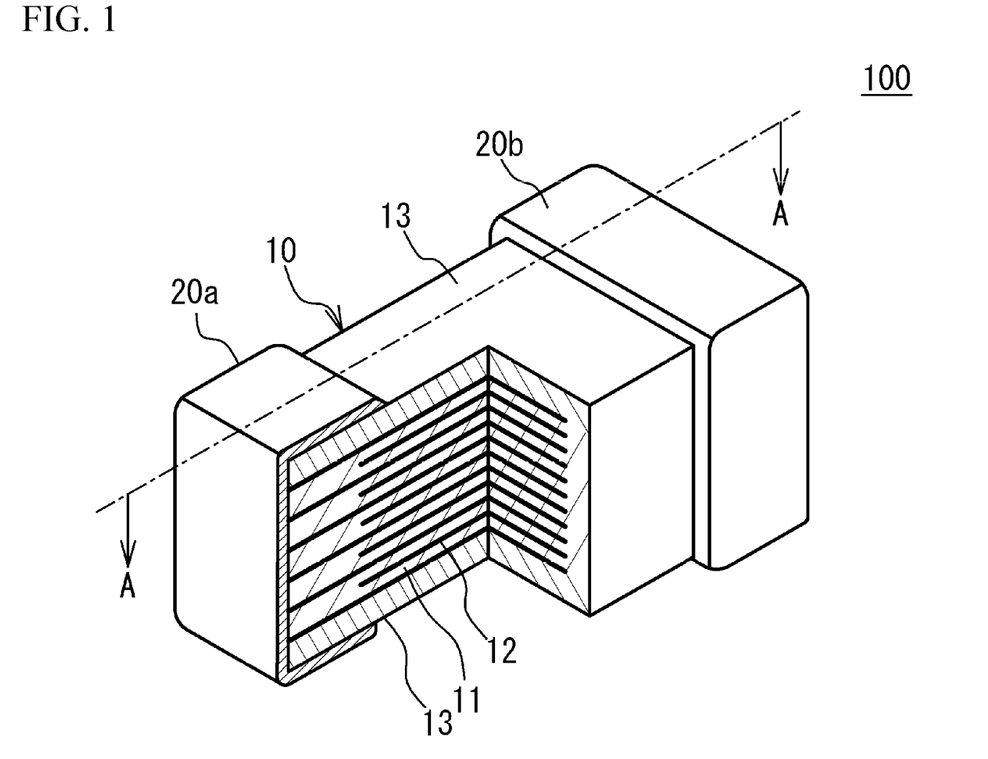
FIG. 1 illustrates a partial perspective view of a multilayer ceramic capacitor.

A description will be given of a multilayer ceramic capacitor. FIG. 1 illustrates a partial perspective view of a multilayer ceramic capacitor 100 in accordance with an embodiment. As illustrated in FIG. 1, the multilayer ceramic capacitor 100 includes a multilayer chip (ceramic main body) 10 having a rectangular parallelepiped shape, and a pair of external electrodes 20a and 20b that are respectively provided at two edge faces of the multilayer chip 10 facing each other. Four faces other than the two edge faces of the multilayer chip 10 are referred to as side faces. The external electrodes 20a and 20b extend to the four side faces. However, the external electrodes 20a and 20b are spaced from each other on the four side faces.

The multilayer chip 10 has a structure designed to have dielectric layers 11 and internal electrode layers 12 alternately stacked. A main component of the dielectric layer 11 is a ceramic material acting as a dielectric material. A main component of the internal electrode layers 12 is a metal material such as a base metal material. End edges of the internal electrode layers 12 are alternately exposed to a first edge face of the multilayer chip 10 and a second edge face of the multilayer chip 10 that is different from the first edge face. In the embodiment, the first face faces with the second face. The external electrode 20a is provided on the first edge face. The external electrode 20b is provided on the second edge face. Thus, the internal electrode layers 12 are alternately conducted to the external electrode 20a and the external electrode 20b. Thus, the multilayer ceramic capacitor 100 has a structure in which a plurality of dielectric layers 11 are stacked and each two of the dielectric layers 11 sandwich the internal electrode layer 12. In the multilayer chip 10, cover layers 13 cover two of the four side faces that correspond to an upper face and a lower face in a stacking direction of the dielectric layers 11 and the internal electrode layers 12 (hereinafter referred to as a stacking direction). A main component of the cover layer 13 is a ceramic material. For example, a main component material of the cover layer 13 is the same as that of the dielectric layer 11.

For example, the multilayer ceramic capacitor 100 may have a length of 0.25 mm, a width of 0.125 mm and a height of 0.125 mm. The multilayer ceramic capacitor 100 may have a length of 0.6 mm, a width of 0.3 mm and a height of 0.3 mm. The multilayer ceramic capacitor 100 may have a length of 1.0 mm, a width of 0.5 mm and a height of 0.5 mm. The multilayer ceramic capacitor 100 may have a length of 3.2 mm, a width of 1.6 mm and a height of 1.6 mm. The multilayer ceramic capacitor 100 may have a length of 4.5 mm, a width of 3.2 mm and a height of 2.5 mm. However, the size of the multilayer ceramic capacitor 100 is not limited.

A main component of the internal electrode layers 12 is a base metal such as nickel (Ni), copper (Cu), tin (Sn) or the like. The internal electrode layers 12 may be made of a noble metal such as platinum (Pt), palladium (Pd), silver (Ag), gold (Au) or alloy thereof. A thickness of the internal electrode layer 12 is, for example, 0.5 μm or less. It is preferable that the thickness of the internal electrode layer 12 is 0.3 μm or less. The dielectric layers 11 are mainly composed of a ceramic material that is expressed by a general formula $ABO_3$ and has a perovskite structure. The perovskite structure includes $ABO_{3-\alpha}$ having an off-stoichiometric composition. For example, the ceramic material is such as $BaTiO_3$ (barium titanate), $CaZrO_3$ (calcium zirconate), $CaTiO_3$ (calcium titanate), $SrTiO_3$ (strontium titanate), $Ba_{1-x-y}Ca_xSr_yTi_{1-z}Zr_zO_3$ ($0 \leq x \leq 1, 0 \leq y \leq 1, 0 \leq z \leq 1$) having a perovskite structure.

Figure 2:
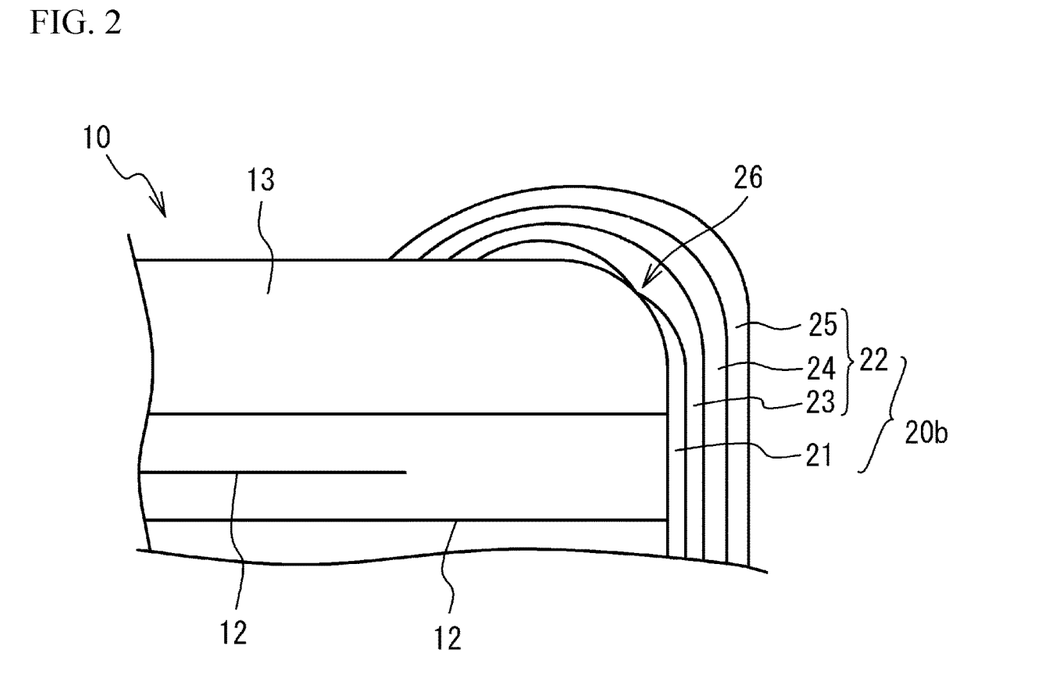
FIG. 2 illustrates a partial cross sectional view of an external electrode that is taken along a line A-A of FIG. 1.

FIG. 2 illustrates a cross sectional view of the external electrode 20b and is a cross sectional view taken along a line A-A of FIG. 1. In FIG. 2, hatching for cross section is omitted. On a surface of the multilayer chip 10, a ceramic material is mainly exposed. Therefore, it is difficult to form a plated layer on the surface of the multilayer chip 10 without a ground layer. And so, as illustrated in FIG. 2, the external electrode 20b has a structure in which a plated layer 22 is formed on a ground layer 21 formed on the surface of the multilayer chip 10.

A main component of the ground layer 21 is a metal such as Cu, Ni, Al (aluminum) or Zn (zinc). Alternatively the main component of the ground layer 21 is an alloy of the metals (for example, an alloy of Cu and Ni). The ground layer 21 includes a glass component for densifying the ground layer 21 or a co-material for controlling sinterability of the ground layer 21. The glass is an oxide of Ba, Sr, Ca, Zn, Al, Si (silicon), B (boron) or the like. The co-material is a ceramic component of which a main component is the same as that of the dielectric layers 11.

A main component of the plated layer 22 is a metal such as Cu, Ni, Al, Zn, Sn (tin) or an alloy of them. The plated layer 22 may be a plated layer of a single metal component or may include a plurality of plated layers having a different metal. For example, the plated layer 22 has a structure in which a first plated layer 23, a second plated layer 24 and a third plated layer 25 are formed on the ground layer 21 in this order. The ground layer 21 and the plated layer 22 cover both of the edge faces of the multilayer chip 10 and extend to at least one of the four side faces of the multilayer chip 10. In the embodiment, the ground layer 21 and the plated layer 22 extend to the four side faces from both of the edge faces of the multilayer chip 10. The first plated layer 23 is, for example, a Cu-plated layer. The second plated layer 24 is, for example, a Ni-plated layer. The third plated layer 25 is, for example, a Sn-plated layer. In FIG. 2, the external electrode 20b is illustrated. The external electrode 20a has the same structure as the external electrode 20b.

The ground layer 21 is formed by coating a conductive metal paste on the two edge faces of the baked multilayer chip 10 and baking the conductive metal paste. Alternatively, the ground layer 21 is formed by coating a conductive metal paste on the two edge faces of the multilayer chip 10 before baking and baking the conductive metal paste together with the multilayer chip 10. However, it is difficult to thickly coat the conductive metal paste on a corner portion (round edge portion) of the multilayer chip 10. Therefore, the ground layer 21 gets thinner on the corner portion of the multilayer chip 10. And a broken portion (a first portion 26 of FIG. 2) occurs in the ground layer 21. The round edge portion is a region that is a corner of the multilayer chip 10 and has a curvature factor.

When the first portion 26 occurs in the ground layer 21, continuity of plating may be degraded. Thereby, the first portion may occur in the plated layer 22. In this case, humidity resistance of the multilayer ceramic capacitor 100 may be degraded. For example, when a load test of humidity resistance is performed, a water-soluble flux may intrude into the first portion 26 of the round edge portion, may reach a connection portion between the internal electrode layers 12 and the external electrodes 20a and 20b, and may degrade the insulating resistance. And so, it is thought that the conductive metal paste is thickly coated so that the first portion 26 does not occur in the ground layer 21. However, in this case, the conductive metal paste is excessively thick on the both edge faces of the multilayer chip 10. Therefore, the size of the multilayer ceramic capacitor 100 may be enlarged. And so, the embodiment suppresses the size enlargement of the multilayer ceramic capacitor 100 and improves the humidity resistance, by forming the plated layer 22 having a sufficiently large thickness and covering the first portion 26.

When a maximum spaced distance of the first portion 26 (referred to as a hole diameter) is excessively large in a face direction (extending direction of the ground layer 21 along a face), it is difficult to sufficiently cover the first portion 26 by the plated layer 22. And so, in the face direction of the ground layer 21, the maximum spaced distance of the first portion 26 is 10 μm or less. With the structure, even if the plated layer 22 is not excessively thick, the first portion 26 is covered with the plated layer 22. That is, it is possible to suppress enlargement of the multilayer ceramic capacitor 100. From a viewpoint of suppression of the thickness enlargement of the plated layer 22, it is preferable that the maximum spaced distance of the first portion 26 is 5 μm or less. It is more preferable that the maximum spaced distance of the first portion 26 is 3 μm or less.

Next, when the plated layer 22 is thin with respect to the maximum spaced distance of the first portion 26, it may not be necessarily possible to sufficiently cover the first portion 26. And so, an average thickness of the plated layer 22 is 30% or more with respect to the maximum spaced distance of the first portion 26. In the structure, it is possible to sufficiently cover the first portion 26. It is therefore possible to improve the humidity resistance. In order to sufficiently cover the first portion 26, it is preferable that the average thickness of the plated layer 22 is 50% or more with respect to the maximum spaced distance of the first portion 26. On the other hand, when the plated layer 22 is excessively thick, the size of the multilayer ceramic capacitor 100 is enlarged. And so, it is preferable that the average thickness of the plated layer 22 is 100% or less with respect to the maximum spaced distance of the first portion 26. It is more preferable that the average thickness of the plated layer 22 is 80% or less with respect to the maximum spaced distance of the first portion 26.

Figure 3A:
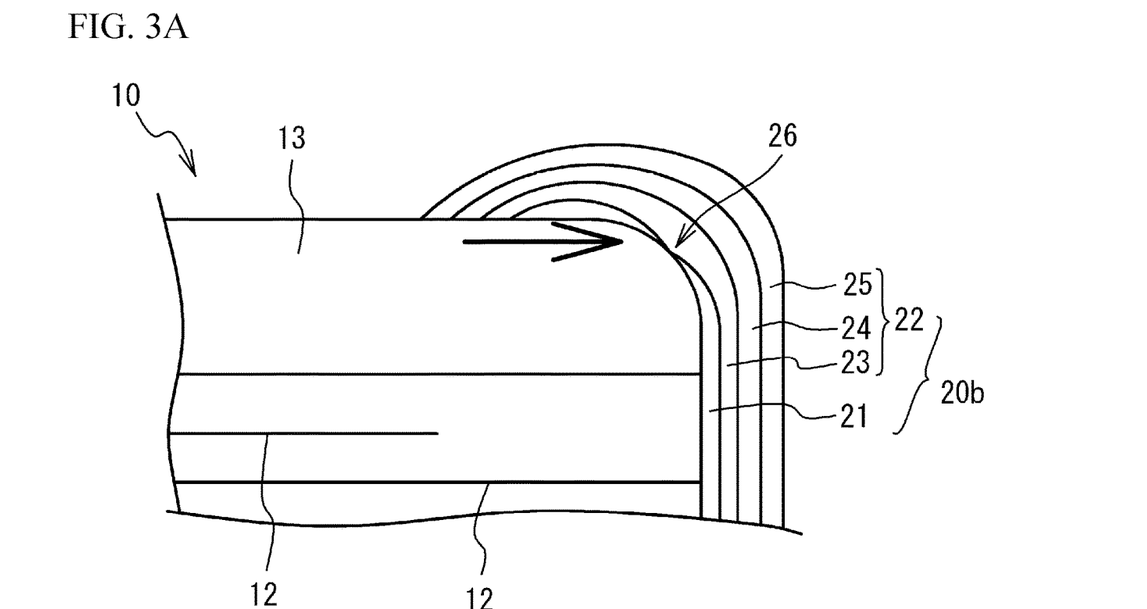
FIG. 3A and FIG. 3B illustrate IR degradation.
Figure 3B:
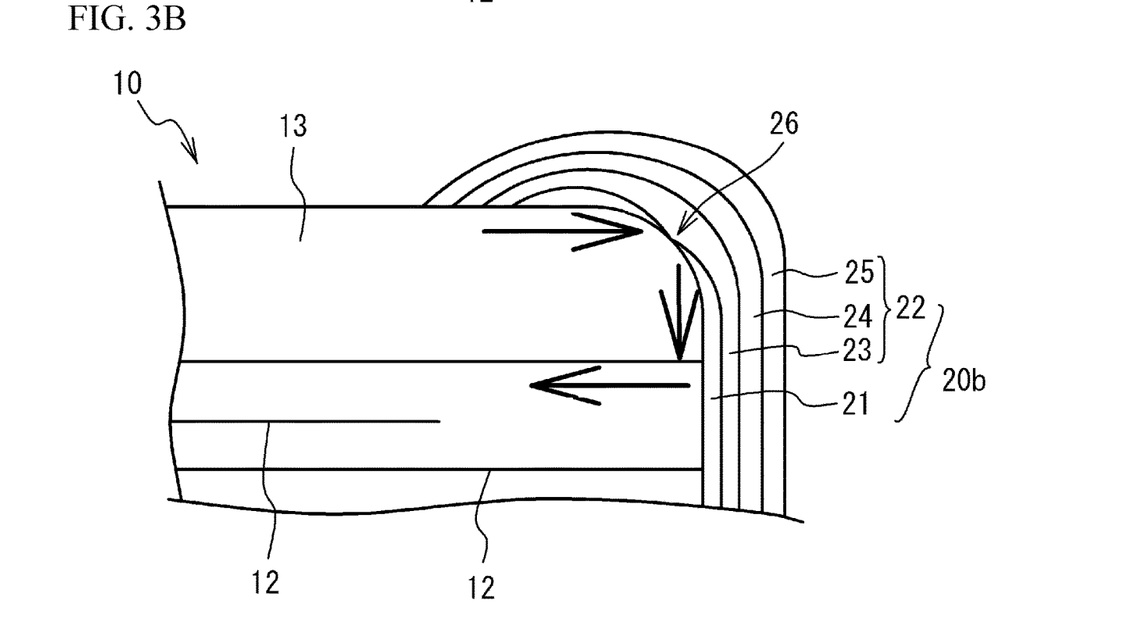

When an average thickness of a total of the first plated layer 23 and the second plated layer 24 is small, the water-soluble flux may react with Sn diffusing from the third plated layer 25 to the first portion 26 during the load test of humidity resistance. In this case, a hydrogen ion may be generated. For example, as illustrated in FIG. 3A, the water-soluble flux may dissolve the glass component of the ground layer 21 and may intrude from the edge of the external electrodes 20a and 20b of the side face of the multilayer chip 10. In this case, as illustrated in FIG. 3B, the hydrogen ion may move to the internal electrode layer 12 in accordance with applied electric field, and the insulating resistance may be degraded. And so, it is preferable that the average thickness of the total of the first plated layer 23 and the second plated layer 24 (a plated layer other than Sn) is large. In concrete, it is preferable that average thickness of the total of the first plated layer 23 and the second plated layer 24 is 30% or more with respect to the maximum spaced distance of the first portion 26. It is more preferable that the average thickness of the total of the first plated layer 23 and the second plated layer 24 is 50% or more with respect to the maximum spaced distance of the first portion 26. Alternatively, it is preferable that one of the average thicknesses of the first plated layer 23 and the second plated layer 24 is 30% or more with respect to the maximum spaced distance of the first portion 26. It is preferable that one of the average thicknesses of the first plated layer 23 and the second plated layer 24 is 50% or more with respect to the maximum spaced distance of the first portion 26.

Figure 4:
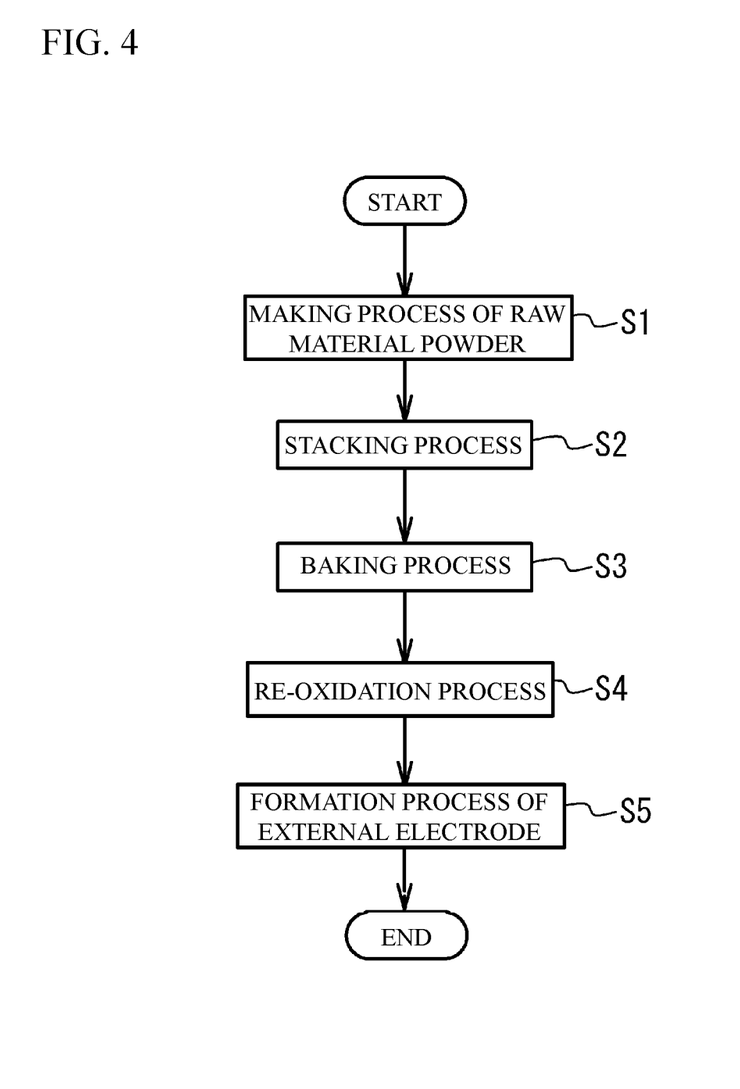
FIG. 4 illustrates a manufacturing method of a multilayer ceramic capacitor.

Next, a description will be given of a manufacturing method of the multilayer ceramic capacitor 100. FIG. 4 illustrates a manufacturing method of the multilayer ceramic capacitor 100.

(Making process of a raw material powder) Additive compound may be added to a ceramic powder material that is the main component of the dielectric layers 11, in accordance with purposes. The additive compound may be an oxide of Mg (magnesium), Mn (manganese), V (vanadium), Cr (chromium) or a rare earth element (Y (yttrium), Sm (samarium), Eu (europium), Gd (gadolinium), Tb (terbium), Dy (dysprosium), Ho (holmium), Er (erbium), Tm (thulium) and Yb (ytterbium)), or an oxide of Co (cobalt), Ni, Li (lithium), B (boron), Na (sodium), K (potassium) and Si, or glass. Compound including additive compound is mixed with the ceramic material powders. The resulting ceramic powders are calcined. Then, the ceramic powders are wet-blended with the additive compound. After that, the ceramic powders with the additive compound are dried and crushed. And, desirable ceramic powder is prepared.

(Stacking Process) Next, a binder such as polyvinyl butyral (PVB) resin, an organic solvent such as ethanol or toluene, and a plasticizer are added to the resulting dielectric material and are wet-blended. With use of the resulting slurry, a strip-shaped dielectric green sheet with a thickness of 0.8 μm or less is coated on a base material by, for example, a die coater method or a doctor blade method, and then dried.

Then, a pattern of the internal electrode layer 12 is provided on the surface of the dielectric green sheet by printing conductive pastes for forming an internal electrode with use of screen printing or gravure printing. The conductive pastes include powders of a main component metal of the internal electrode layers 12, a binder, an solvent and additives if necessary. It is preferable that the binder and the solvent are different from those of the ceramic slurry. The ceramic material that is the main component of the dielectric layers 11 and acts as the co-material may be dispersed into the conductive paste.

Then, the dielectric green sheet on which the internal electrode layer pattern is printed is stamped into a predetermined size, and a predetermined number (for example, 200 to 500) of stamped dielectric green sheets are stacked while the base material is peeled so that the internal electrode layers 12 and the dielectric layers 11 are alternated with each other and the end edges of the internal electrode layers 12 are alternately exposed to both end faces in the length direction of the dielectric layer so as to be alternately led out to a pair of external electrodes of different polarizations. Cover sheets, which are to be the cover layers 13, are stacked on the stacked green sheets and under the stacked sheets and are thermally compressed. The resulting compact is cut into a predetermined size (for example, 1.0 mm×0.5 mm). Thus, a ceramic multilayer structure having a parallelepiped shape is formed.

(Baking Process) The binder is removed from the ceramic multilayer structure in $N_2$ atmosphere of 250 degrees C. to 500 degrees C. The resulting ceramic multilayer structure is baked for 10 minutes to 2 hours in a reductive atmosphere in a temperature range of 1100 degrees C. to 1300 degrees C. Thus, each compound structuring the dielectric green sheet is sintered. And a grains of each compound grows. In this manner, the multilayer ceramic capacitor 100 having the multilayer chip 10 and the cover layers 13 is obtained. In the multilayer chip 10, each of the sintered dielectric layers 11 and each of the sintered internal electrode layers 12 are alternately stacked. The cover layers 13 are the outermost layers of the multilayer chip 10 in the stacking direction.

(Re-oxidizing process) After that, the multilayer ceramic capacitor 100 may be subjected to a re-oxidizing process in $N_2$ gas atmosphere in a temperature range of 600 degrees C. to 1000 degrees C.

(Forming process of external electrode) Next, the external electrodes 20a and 20b are formed on the multilayer chip 10. As a forming method of the external electrodes 20a and 20b, there are a method of baking the ground layer 21 after baking the multilayer chip 10 and a method of baking the multilayer chip 10 together with the ground layer 21. A description will be given of the method of baking the ground layer 21 after baking the multilayer chip 10.

A conductive metal paste including a metal filler, a glass frit, a binder and a solvent is coated on the both edge faces of the multilayer chip 10, and is dried. After that, the conductive metal paste is baked. Thus, the ground layer 21 is formed. The binder and the solvent vaporize by the baking. The thickness of the conductive metal paste is adjusted so that the maximum spaced distance of the first portion 26 is 10 μm or less in the face direction of the ground layer 21, in the ground layer 21 after baking. It is preferable that the maximum spaced distance is 5 μm or less. It is more preferable that the maximum spaced distance is 3 μm or less.

After that, the plated layer 22 is formed by plating so that the first portion 26 is covered with the plated layer 22. In this case, the plated layer 22 is formed so that the average thickness of the plated layer 22 is 30% or more with respect to the maximum spaced distance of the first portion 26. It is preferable that the average thickness of the plated layer 22 is 50% or more with respect to the maximum spaced distance of the first portion 26. It is preferable that the average thickness of the plated layer 22 is 100% or less with respect to the maximum spaced distance of the first portion 26. It is more preferable that the average thickness of the plated layer 22 is 80% or less with respect to the maximum spaced distance of the first portion 26. Alternatively, it is preferable that the average thickness of the total of the first plated layer 23 and the second plated layer 24 (a plated layer other than Sn) is 30% or more with respect to the maximum spaced distance of the first portion 26. It is more preferable that average thickness of the total of the first plated layer 23 and the second plated layer 24 is 50% or more with respect to the maximum spaced distance of the first portion 26. Alternatively, it is preferable that one of the average thicknesses of the first plated layer 23 and the second plated layer 24 is 30% or more with respect to the maximum spaced distance of the first portion 26. It is more preferable that one of the average thicknesses of the first plated layer 23 and the second plated layer 24 is 50% or more with respect to the maximum spaced distance of the first portion 26.

It is preferable that the metal filler is Cu or the like. It is preferable that the baking is performed for three minutes to 30 minutes in a temperature range of 700 degrees C. to 900 degrees C. It is more preferable that the baking is performed for 5 minutes to 15 minutes in a temperature range of 760 degrees C. to 840 degrees C.

Figure 5:
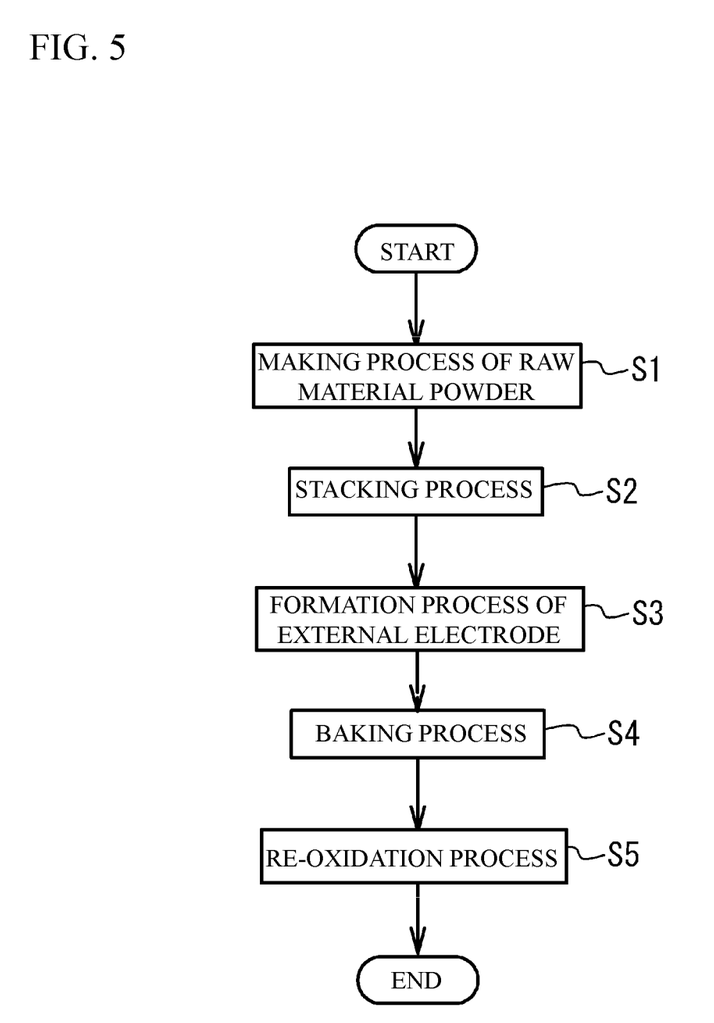
FIG. 5 illustrates a manufacturing method of a multilayer ceramic capacitor.

Next, a description will be given of the method of baking the multilayer chip 10 together with the ground layer 21. In this case, as illustrated in FIG. 5, the binder is removed from the ceramic multilayer structure made in the stacking process in N$_2$ atmosphere in a temperature range of 250 degrees C. to 500 degrees C. After that, the conductive metal paste including the metal filler, the co-material, the binder and the solvent is coated on the both edge faces of the ceramic multilayer structure and is dried. After that, the conductive metal paste is baked together with the ceramic multilayer structure. For example, the baking condition is described in the above-mentioned baking process. The thickness of the conductive paste is adjusted so that the maximum spaced distance of the first portion 26 is 10 µm or less in the face direction of the ground layer 21, in the ground layer 21 after baking. It is preferable that the maximum spaced distance is 5 µm or less. It is more preferable that the maximum spaced distance is 3 µm or less. After that, a re-oxidation process may be performed in N$_2$ atmosphere of 600 degrees C. to 1000 degrees C.

After that, the plated layer 22 is formed by plating so that the first portion 26 is covered with the plated layer 22. In this case, the plated layer 22 is formed so that the average thickness of the plated layer 22 is 30% or more with respect to the maximum spaced distance of the first portion 26. It is preferable that the average thickness of the plated layer 22 is 50% or more with respect to the maximum spaced distance of the first portion 26. It is preferable that the average thickness of the plated layer 22 is 100% or less with respect to the maximum spaced distance of the first portion 26. It is more preferable that the average thickness of the plated layer 22 is 80% or less with respect to the maximum spaced distance of the first portion 26. Alternatively, it is preferable that the average thickness of the total of the first plated layer 23 and the second plated layer 24 (a plated layer other than Sn) is 30% or more with respect to the maximum spaced distance of the first portion 26. It is more preferable that the average thickness of the total of the first plated layer 23 and the second plated layer 24 is 50% or more with respect to the maximum spaced distance of the first portion 26. Alternatively, it is preferable that one of the average thicknesses of the first plated layer 23 and the second plated layer 24 is 30% or more with respect to the maximum spaced distance of the first portion 26. It is preferable that one of the average thicknesses of the first plated layer 23 and the second plated layer 24 is 50% or more with respect to the maximum spaced distance of the first portion 26. It is preferable that the metal filler is Ni or the like.

In the manufacturing method of the embodiment, the maximum spaced distance of the first portion 26 is 10 µm or less. Therefore, even if the plated layer 22 is not excessively thick, the first portion 26 is covered with the plated layer 22. That is, it is possible to suppress enlargement of the multilayer ceramic capacitor 100. When the average thickness of the plated layer 22 is 30% or more with respect to the maximum spaced distance of the first portion 26, the first portion 26 is sufficiently covered with the plated layer 22. It is therefore possible to improve the humidity resistance of the multilayer ceramic capacitor 100.

In the embodiments, the multilayer ceramic capacitor is described as an example of ceramic electronic devices. However, the embodiments are not limited to the multilayer ceramic capacitor. For example, the embodiments may be applied to another electronic device such as varistor or thermistor.

EXAMPLES

The multilayer ceramic capacitors in accordance with the embodiment were made and the property was measured.

(Examples 1 to 11 and comparative examples 1 to 4) The multilayer chips 10 baked without forming the external electrodes were prepared. Next, the conductive metal paste including a Cu filler, a glass frit, a binder and a solvent was coated on the both edge faces of the multilayer chips 10 and was dried. After that, the conductive metal paste was baked. Thus, the ground layer 21 was formed. The binder and the solvent vaporized by the baking. The maximum spaced distance of the first portion 26 in the face direction of the ground layer 21 was 9.4 µm in an example 1, 4.5 µm in an example 2, 3.9 µm in an example 3, 3.1 µm in an example 4, 2.9 µm in an example 5, 2.4 µm in an example 6, 9.2 µm in an example 7, 4.7 µm in an example 8, 3.8 µm in an example 9, 3.0 µm in an example 10, 2.8 µm in an example 11, 6.5 µm in a comparative example 1, 3.1 µm in a comparative example 2, 23.5 µm in a comparative example 3 and 15.4 µm in a comparative example 4.

After that, in the examples 1 to 6 and the comparative examples 1 to 4, the first plated layer 23 was not formed. And the second plated layer 24 of Ni was formed. An average thickness of the second plated layer 24 was 4.9 µm in the example 1, 3.2 µm in the example 2, 3.5 µm in the example 3 and the example 4, 4.4 µm in the example 5, 1.9 µm in the example 6, 0.7 µm in the comparative example 1, 0.8 µm in the comparative example 2, 6.1 µm in the comparative example 3, and 8.4 µm in the comparative example 4. In the examples 7 to 11, the first plated layer 23 of Cu was formed. And the second plated layer 24 of Ni was formed on the first plated layer 23. An average thickness of the first plated layer 23 was 3.7 µm in the example 7, 2.1 µm in the example 8, 2.3 µm in the example 9, 2.1 µm in the example 10, and 1.1 µm in the example 11. An average thickness of the second plated layer 24 was 1.2 µm in the example 7, 1.4 µm in the example 8, 1.3 µm in the example 9, 1.2 µm in the example 10, and 1.0 µm in the example 11. And in any of the examples 1 to 11 and the comparative examples 1 to 4, the third plated layer 25 of Sn was formed on the second plated layer 24. An average thickness of the third layer was 5 µm. 200 samples were made with respect to each of the examples 1 to 11 and the comparative examples 1 to 4.

(Analysis) A condition of the second plated layer 24 (covering) was confirmed with respect to each sample of the examples 1 to 11 and the comparative examples 1 to 4. And each sample was subjected to a reliability test. In the confirming of the condition of the second plated layer 24, it was confirmed whether a discontinuous portion occurred in the second plated layer 24 or not. It was determined as good "circle" when there was no discontinuous portion on the whole of the second plated layer 24. It was determined as bad "cross" when even a little amount of a discontinuous portion occurred in the second plated layer 24. In the reliability test, a withstand test of a temperature=85 degrees C., a relative humidity=85% and 10V was performed for 1000 h. In this case, the number of abnormal samples of which the insulating resistance was 100 MΩ or less for 60 seconds or more was measured.

Figure 6:
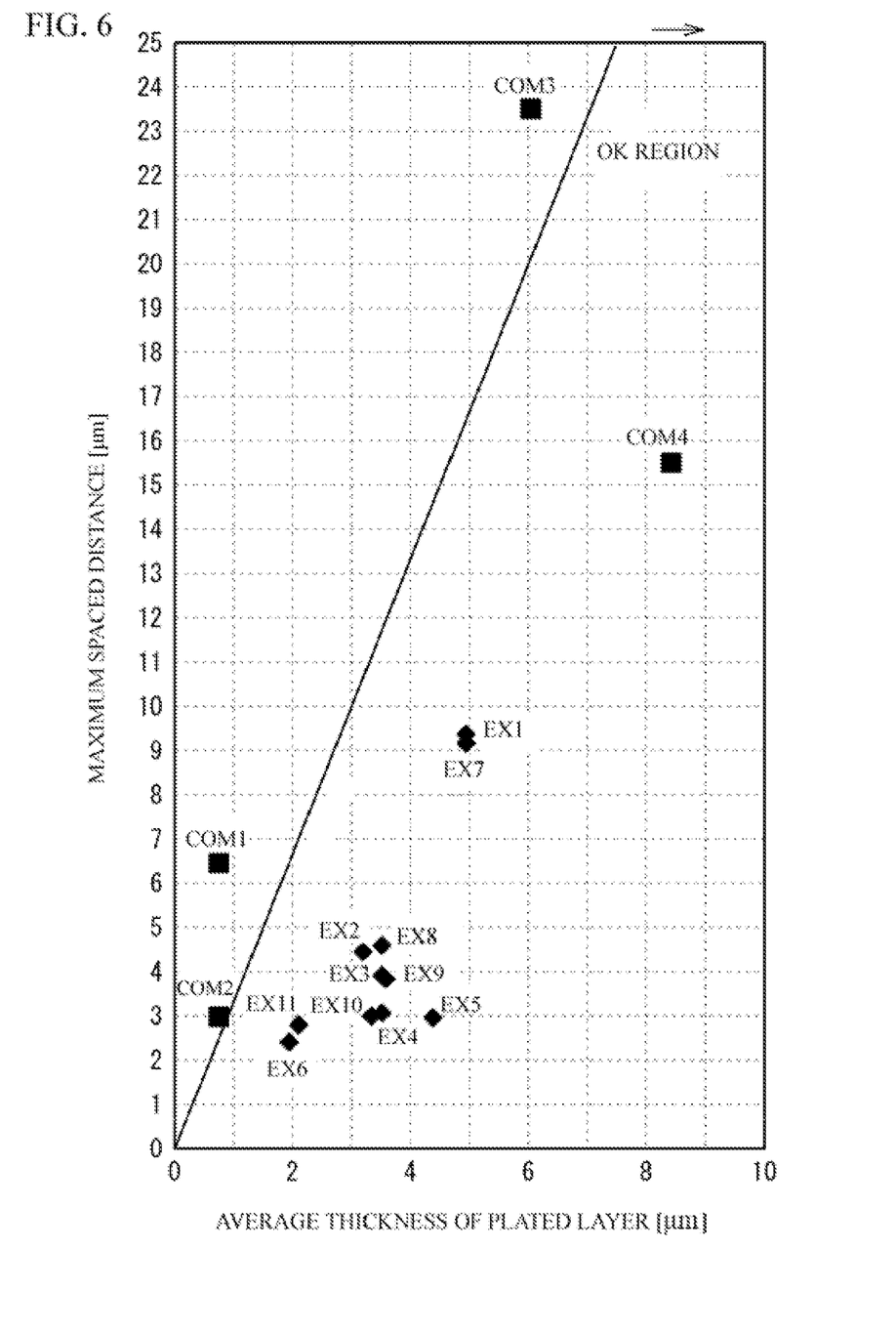
FIG. 6 illustrates results of confirming of condition of a second plated layer and a reliability test.

Table 1 and FIG. 6 show results of the confirming of the condition of the second plated layer 24 and the reliability test. In FIG. 6, "Ex" indicates the examples. A number after "Ex" indicates the example number. "Com" indicates the comparative examples. A number after "Com" indicates the comparative example number. As shown in Table 1, in any of the examples 1 to 11, the discontinuous portion did not occur in the second plated layer 24. And in any of the examples 1 to 11, the number of the abnormal samples was zero with respect to the reliability test. It is thought that this was because the average thickness of the total of the first plated layer 23 and the second plated layer 24 was 30% or more with respect to the maximum spaced distance of the ground layer 21, as illustrated in FIG. 6. In any of the examples 1 to 11, the average thickness of the second plated layer 24 or the average thickness of the total of the first plated layer 23 and the second plated layer 24 was 5 µm or less. This was because the maximum spaced distance was 10 µm or less and the second plated layer 24 was not excessively thick.

In the comparative example 1, a discontinuous portion occurred in the second plated layer 24, and the number of the abnormal samples was 14 in the reliability test. It is thought that this was because the average thickness of the second plated layer 24 was less than 30% with respect to the maximum spaced distance of the ground layer 21. In the comparative examples 2 and 3, no discontinuous portion occurred in the second plated layer 24. However, the number of the abnormal samples of the comparative example 2 was 4 in the reliability test. The number of the abnormal samples of the comparative example 3 was 6 in the reliability test. It is thought that this was because the average thickness of the second plated layer 24 was less than 30% with respect to the maximum spaced distance of the ground layer 21 as illustrated in FIG. 6 although the average thickness of the second plated layer 24 was 26% with respect to the maximum spaced distance of the ground layer 21 and near 30%. In the comparative example 4, no discontinuous portion occurred in the second plated layer 24, and the number of the abnormal samples was zero in the reliability test. It is thought that this was because the average thickness of the second plated layer 24 was 30% or more with respect to the maximum spaced distance of the ground layer 21. However, the maximum spaced distance was 15.4 µm that was a large value. Therefore, it was necessary to enlarge the average thickness of the second plated layer 24 to 8.4 µm. And the size of the multilayer ceramic capacitor of the comparative example 4 was enlarged.

Although the embodiments of the present invention have been described in detail, it is to be understood that the various change, substitutions, and alterations could be made hereto without departing from the spirit and scope of the invention.

What is claimed is:

1. A ceramic electronic device comprising:
a ceramic main body that has at least two edge faces facing each other, has an internal electrode layer inside thereof and has a parallelepiped shape; and
external electrodes formed on the two edge faces,
wherein:
the external electrodes have a structure in which a plated layer is formed on a ground layer having ceramic;
a main component of the ground layer is a metal;
the external electrodes have an extension region that extends to at least one of four side faces from the two edge faces of the ceramic main body;
a part of the extension region corresponding to a corner portion of the ceramic main body includes a portion

TABLE 1

| | MAXIMUM SPACED DISTANCE [µm] | AVERAGE THICKNESS OF 1ST PLATED LAYER [µm] | AVERAGE THICKNESS OF 2ND PLATED LAYER [µm] | THICKNESS/ DISTANCE (%) | CONDITION OF PLATING | RELIABIL- ITY TEST |
|---|---|---|---|---|---|---|
| EXAMPLE 1 | 9.4 | — | 4.9 | 52 | ○ | 0/200 |
| EXAMPLE 2 | 4.5 | — | 3.2 | 71 | ○ | 0/200 |
| EXAMPLE 3 | 3.9 | — | 3.5 | 90 | ○ | 0/200 |
| EXAMPLE 4 | 3.1 | — | 3.5 | 113 | ○ | 0/200 |
| EXAMPLE 5 | 2.9 | — | 4.4 | 152 | ○ | 0/200 |
| EXAMPLE 6 | 2.4 | — | 1.9 | 79 | ○ | 0/200 |
| EXAMPLE 7 | 9.2 | 3.7 | 1.2 | 53 | ○ | 0/200 |
| EXAMPLE 8 | 4.7 | 2.1 | 1.4 | 74 | ○ | 0/200 |
| EXAMPLE 9 | 3.8 | 2.3 | 1.3 | 95 | ○ | 0/200 |
| EXAMPLE 10 | 3.0 | 2.1 | 1.2 | 110 | ○ | 0/200 |
| EXAMPLE 11 | 2.8 | 1.1 | 1.0 | 75 | ○ | 0/200 |
| COMPARATIVE EXAMPLE 1 | 6.5 | — | 0.7 | 11 | x | 14/200 |
| COMPARATIVE EXAMPLE 2 | 3.1 | — | 0.8 | 26 | ○ | 4/200 |
| COMPARATIVE EXAMPLE 3 | 23.5 | — | 6.1 | 26 | ○ | 6/200 |
| COMPARATIVE EXAMPLE 4 | 15.4 | — | 8.4 | 55 | ○ | 0/200 | where the ground layer is formed, and a first portion where the ground layer is not formed;

the plated layer covers not only the ground layer but also the first portion; and the average thickness of the plated layer is 50% or more and 100% or less with respect to a maximum distance of the first portion along a surface of the ceramic main body.

2. The ceramic electronic device as claimed in claim 1, wherein a main component of the ground layer is Cu, Ni or an alloy of Cu and Ni.

3. The ceramic electronic device as claimed in claim 1, wherein a main component of the plated layer is Cu, Ni or an alloy of Cu and Ni.

4. The ceramic electronic device as claimed in claim 1, wherein:

the plated layer includes a first plated layer and a second plated layer;

the first plated layer is formed on the first portion and the ground layer;

a main component of the first plated layer is Cu;

the second plated layer is formed on the first plated layer; and a main component of the second plated layer is Ni.

5. The ceramic electronic device as claimed in claim 1, wherein the first portion has a maximum distance of 10 μm or less along a surface of the ceramic main body.

6. A ceramic electronic device comprising:

a ceramic main body that has at least two edge faces facing each other, has an internal electrode layer inside thereof and has a parallelepiped shape; and external electrodes formed on the two edge faces, wherein:

the external electrodes have a structure in which a plated layer is formed on a ground layer having ceramic;

a main component of the ground layer is a metal;

the external electrodes have an extension region that extends to at least one of four side faces from the two edge faces of the ceramic main body;

a part of the extension region corresponding to a corner portion of the ceramic main body includes a portion where the ground layer is formed, and a first portion where the ground layer is not formed;

the plated layer covers not only the ground layer but also the first portion; and the plated layer has an average thickness that is 30% or more with respect to a maximum distance of the first portion along a surface of the ceramic main body.

7. A manufacturing method of a ceramic electronic device comprising:

preparing a ceramic main body that has at least two edge faces facing each other, has an internal electrode layer inside thereof, has a parallelepiped shape and has a ground layer, a main component of the ground layer being a metal, the ground layer having an extension region extending from the two edge faces toward at least one of four side faces of the ceramic main body, a part of the extension region corresponding to a corner portion of the ceramic main body including a portion where the ground layer is formed, and a first portion where the ground layer is not formed; and forming a plated layer on the ground layer and the first portion by a plating process;

wherein the average thickness of the plated layer is 50% or more and 100% or less with respect to a maximum distance of the first portion along a surface of the ceramic main body.

8. The manufacturing method of the ceramic electronic device as claimed in claim 7, wherein the first portion has a maximum distance of 10 μm or less along a surface of the ceramic main body.

* * * * *